United States Patent
Chui et al.

(10) Patent No.: US 7,626,581 B2
(45) Date of Patent: Dec. 1, 2009

(54) DEVICE AND METHOD FOR DISPLAY MEMORY USING MANIPULATION OF MECHANICAL RESPONSE

(75) Inventors: Clarence Chui, San Mateo, CA (US); Manish Kothari, Cupertino, CA (US)

(73) Assignee: IDC, LLC, San Francisco, CA (US)

( * ) Notice: Subject to any disclaimer, the term of this patent is extended or adjusted under 35 U.S.C. 154(b) by 778 days.

(21) Appl. No.: 11/112,487

(22) Filed: Apr. 22, 2005

(65) Prior Publication Data

US 2006/0077505 A1     Apr. 13, 2006

Related U.S. Application Data

(60) Provisional application No. 60/613,450, filed on Sep. 27, 2004.

(51) Int. Cl.
*G02F 1/01*     (2006.01)
(52) U.S. Cl. ............................ 345/204; 345/84; 345/85; 345/86; 345/108; 345/109; 345/110; 345/111; 359/198; 359/290; 359/291
(58) Field of Classification Search ............. 345/84–86, 345/108–111
See application file for complete search history.

(56) References Cited

U.S. PATENT DOCUMENTS

| | | | |
|---|---|---|---|
| 3,982,239 A | 9/1976 | Sherr | |
| 4,403,248 A | 9/1983 | te Velde | |
| 4,441,791 A | 4/1984 | Hornbeck | |
| 4,459,182 A | 7/1984 | te Velde | |
| 4,482,213 A | 11/1984 | Piliavin et al. | |
| 4,500,171 A | 2/1985 | Penz et al. | |

(Continued)

FOREIGN PATENT DOCUMENTS

EP     0295802 A     12/1988

(Continued)

OTHER PUBLICATIONS

Seeger et al., "Stabilization of Electrostatically Actuated Mechanical Devices", (1997) International Conference on Solid State Sensors and Actuators; vol. 2, pp. 1133-1136.

(Continued)

*Primary Examiner*—Bipin Shalwala
*Assistant Examiner*—Afroza Y Chowdhury
(74) *Attorney, Agent, or Firm*—Knobbe Martens Olson & Bear, LLP

(57) ABSTRACT

Embodiments of an exemplary MEMS interferometric modulator comprise a movable layer and a fixed layer separated by an air gap. A driving scheme employs row/column actuation protocols which maintain voltages to the MEMS interferometric modulator that are above or below the voltage range necessary to place the MEMS interferometric modulator within a "hysteresis window" or "stability window." Stable operation of the MEMS interferometric modulator is achieved by selecting mechanical design features that optimize the actuation and release times of the interferometric modulator. Some of the features affecting the release and actuation times include altering post spacing, altering internal stress or tension of the movable layer, altering the thickness or composition of the movable layer, altering the bulkiness of the tethers, perforating the movable layer and providing vias in the fixed layer.

24 Claims, 16 Drawing Sheets

U.S. PATENT DOCUMENTS

| | | |
|---|---|---|
| 4,519,676 A | 5/1985 | te Velde |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,681,403 A | 7/1987 | te Velde et al. |
| 4,709,995 A | 12/1987 | Kuribayashi et al. |
| 4,710,732 A | 12/1987 | Hornbeck |
| 4,856,863 A | 8/1989 | Sampsell et al. |
| 4,859,060 A | 8/1989 | Katagiri et al. |
| 4,954,789 A | 9/1990 | Sampsell |
| 4,956,619 A | 9/1990 | Hornbeck |
| 4,982,184 A | 1/1991 | Kirkwood |
| 5,018,256 A | 5/1991 | Hornbeck |
| 5,028,939 A | 7/1991 | Hornbeck et al. |
| 5,037,173 A | 8/1991 | Sampsell et al. |
| 5,055,833 A | 10/1991 | Hehlen, deceased et al. |
| 5,061,049 A | 10/1991 | Hornbeck |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,142,405 A | 8/1992 | Hornbeck |
| 5,142,414 A | 8/1992 | Koehler et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,227,900 A | 7/1993 | Inaba et al. |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,287,215 A | 2/1994 | Warde et al. |
| 5,296,950 A | 3/1994 | Lin et al. |
| 5,305,640 A | 4/1994 | Boysel et al. |
| 5,312,513 A | 5/1994 | Florence et al. |
| 5,323,002 A | 6/1994 | Sampsell et al. |
| 5,325,116 A | 6/1994 | Sampsell |
| 5,327,286 A | 7/1994 | Sampsell et al. |
| 5,331,454 A | 7/1994 | Hornbeck |
| 5,339,116 A | 8/1994 | Urbanus et al. |
| 5,365,283 A | 11/1994 | Doherty et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,461,411 A | 10/1995 | Florence et al. |
| 5,488,505 A | 1/1996 | Engle |
| 5,489,952 A | 2/1996 | Gove et al. |
| 5,497,172 A | 3/1996 | Doherty et al. |
| 5,497,197 A | 3/1996 | Gove et al. |
| 5,499,062 A | 3/1996 | Urbanus |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,563,398 A | 10/1996 | Sampsell |
| 5,567,334 A | 10/1996 | Baker et al. |
| 5,570,135 A | 10/1996 | Gove et al. |
| 5,578,976 A | 11/1996 | Yao |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,598,565 A | 1/1997 | Reinhardt |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,612,713 A | 3/1997 | Bhuva et al. |
| 5,619,061 A | 4/1997 | Goldsmith et al. |
| 5,619,365 A | 4/1997 | Rhoads et al. |
| 5,619,366 A | 4/1997 | Rhoads et al. |
| 5,629,790 A | 5/1997 | Neukermans et al. |
| 5,633,652 A | 5/1997 | Kanbe et al. |
| 5,636,052 A | 6/1997 | Arney et al. |
| 5,638,084 A | 6/1997 | Kalt |
| 5,638,946 A | 6/1997 | Zavracky |
| 5,646,768 A | 7/1997 | Kaeriyama |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,745,193 A | 4/1998 | Urbanus et al. |
| 5,745,281 A | 4/1998 | Yi et al. |
| 5,754,160 A | 5/1998 | Shimizu et al. |
| 5,771,116 A | 6/1998 | Miller et al. |
| 5,784,189 A | 7/1998 | Bozler et al. |
| 5,784,212 A | 7/1998 | Hornbeck |
| 5,808,780 A | 9/1998 | McDonald |
| 5,818,095 A | 10/1998 | Sampsell |
| 5,835,255 A | 11/1998 | Miles |
| 5,842,088 A | 11/1998 | Thompson |
| 5,867,302 A | 2/1999 | Fleming et al. |
| 5,912,758 A | 6/1999 | Knipe et al. |
| 5,943,158 A | 8/1999 | Ford et al. |
| 5,959,763 A | 9/1999 | Bozler et al. |
| 5,966,235 A | 10/1999 | Walker et al. |
| 5,986,796 A | 11/1999 | Miles |
| 6,028,690 A | 2/2000 | Carter et al. |
| 6,038,056 A | 3/2000 | Florence et al. |
| 6,040,937 A | 3/2000 | Miles |
| 6,049,317 A | 4/2000 | Thompson et al. |
| 6,055,090 A | 4/2000 | Miles |
| 6,061,075 A | 5/2000 | Nelson et al. |
| 6,099,132 A | 8/2000 | Kaeriyama |
| 6,100,872 A | 8/2000 | Aratani et al. |
| 6,113,239 A | 9/2000 | Sampsell et al. |
| 6,147,790 A | 11/2000 | Meier et al. |

| | | | | | | |
|---|---|---|---|---|---|---|
| 6,160,833 | A | 12/2000 | Floyd et al. | 7,283,112 B2 * | 10/2007 | Starkweather et al. ......... 345/84 |
| 6,180,428 | B1 | 1/2001 | Peeters et al. | 2001/0003487 A1 | 6/2001 | Miles |
| 6,201,633 | B1 | 3/2001 | Peeters et al. | 2001/0011978 A1 * | 8/2001 | Doherty et al. ............... 345/84 |
| 6,232,936 | B1 | 5/2001 | Gove et al. | 2001/0034075 A1 | 10/2001 | Onoya |
| 6,275,326 | B1 | 8/2001 | Bhalla et al. | 2001/0043171 A1 | 11/2001 | Van Gorkom et al. |
| 6,282,010 | B1 | 8/2001 | Sulzbach et al. | 2001/0046081 A1 | 11/2001 | Hayashi et al. |
| 6,295,154 | B1 | 9/2001 | Laor et al. | 2001/0051014 A1 | 12/2001 | Behin et al. |
| 6,304,297 | B1 | 10/2001 | Swan | 2002/0000959 A1 * | 1/2002 | Colgan et al. ................. 345/84 |
| 6,323,982 | B1 | 11/2001 | Hornbeck | 2002/0005827 A1 | 1/2002 | Kobayashi |
| 6,327,071 | B1 | 12/2001 | Kimura | 2002/0012159 A1 | 1/2002 | Tew |
| 6,348,907 | B1 * | 2/2002 | Wood ........................ 345/84 | 2002/0015215 A1 | 2/2002 | Miles |
| 6,356,085 | B1 | 3/2002 | Ryat et al. | 2002/0024711 A1 | 2/2002 | Miles |
| 6,356,254 | B1 | 3/2002 | Kimura | 2002/0036304 A1 | 3/2002 | Ehmke et al. |
| 6,429,601 | B1 | 8/2002 | Friend et al. | 2002/0050882 A1 | 5/2002 | Hyman et al. |
| 6,433,917 | B1 | 8/2002 | Mei et al. | 2002/0054424 A1 | 5/2002 | Miles et al. |
| 6,447,126 | B1 | 9/2002 | Hornbeck | 2002/0075226 A1 | 6/2002 | Lippincott |
| 6,465,355 | B1 | 10/2002 | Horsley | 2002/0075555 A1 | 6/2002 | Miles |
| 6,466,358 | B2 | 10/2002 | Tew | 2002/0093722 A1 | 7/2002 | Chan et al. |
| 6,473,274 | B1 | 10/2002 | Maimone et al. | 2002/0097133 A1 | 7/2002 | Charvet et al. |
| 6,480,177 | B2 * | 11/2002 | Doherty et al. ............... 345/84 | 2002/0126364 A1 | 9/2002 | Miles |
| 6,496,122 | B2 | 12/2002 | Sampsell | 2002/0179421 A1 | 12/2002 | Williams et al. |
| 6,501,107 | B1 | 12/2002 | Sinclair et al. | 2002/0186108 A1 | 12/2002 | Hallbjorner |
| 6,507,330 | B1 | 1/2003 | Handschy et al. | 2003/0004272 A1 | 1/2003 | Power |
| 6,507,331 | B1 | 1/2003 | Schlangen et al. | 2003/0043157 A1 | 3/2003 | Miles |
| 6,545,335 | B1 | 4/2003 | Chua et al. | 2003/0072070 A1 | 4/2003 | Miles |
| 6,548,908 | B2 | 4/2003 | Chua et al. | 2003/0122773 A1 | 7/2003 | Washio et al. |
| 6,549,338 | B1 | 4/2003 | Wolverton et al. | 2003/0137215 A1 | 7/2003 | Cabuz |
| 6,552,840 | B2 | 4/2003 | Knipe | 2003/0137521 A1 | 7/2003 | Zehner et al. |
| 6,574,033 | B1 | 6/2003 | Chui et al. | 2003/0189536 A1 | 10/2003 | Ruigt |
| 6,589,625 | B1 | 7/2003 | Kothari et al. | 2003/0202264 A1 | 10/2003 | Weber et al. |
| 6,593,934 | B1 | 7/2003 | Liaw et al. | 2003/0202265 A1 | 10/2003 | Reboa et al. |
| 6,600,201 | B2 | 7/2003 | Hartwell et al. | 2003/0202266 A1 | 10/2003 | Ring et al. |
| 6,606,175 | B1 | 8/2003 | Sampsell et al. | 2004/0008396 A1 | 1/2004 | Stappaerts |
| 6,625,047 | B2 | 9/2003 | Coleman, Jr., deceased | 2004/0022044 A1 | 2/2004 | Yasuoka et al. |
| 6,630,786 | B2 | 10/2003 | Cummings et al. | 2004/0027701 A1 | 2/2004 | Ishikawa |
| 6,632,698 | B2 | 10/2003 | Ives | 2004/0051929 A1 | 3/2004 | Sampsell et al. |
| 6,643,069 | B2 | 11/2003 | Dewald | 2004/0058532 A1 | 3/2004 | Miles et al. |
| 6,650,455 | B2 | 11/2003 | Miles | 2004/0080807 A1 | 4/2004 | Chen et al. |
| 6,666,561 | B1 | 12/2003 | Blakley | 2004/0145049 A1 | 7/2004 | McKinnell et al. |
| 6,674,090 | B1 | 1/2004 | Chua et al. | 2004/0147056 A1 | 7/2004 | McKinnell et al. |
| 6,674,562 | B1 | 1/2004 | Miles | 2004/0160143 A1 | 8/2004 | Shreeve et al. |
| 6,680,792 | B2 | 1/2004 | Miles | 2004/0174583 A1 | 9/2004 | Chen et al. |
| 6,710,908 | B2 | 3/2004 | Miles et al. | 2004/0179281 A1 | 9/2004 | Reboa |
| 6,712,473 | B2 * | 3/2004 | Kurematsu ................... 353/99 | 2004/0212026 A1 | 10/2004 | Van Brocklin et al. |
| 6,741,377 | B2 | 5/2004 | Miles | 2004/0217378 A1 | 11/2004 | Martin et al. |
| 6,741,384 | B1 | 5/2004 | Martin et al. | 2004/0217919 A1 | 11/2004 | Pichl et al. |
| 6,741,503 | B1 | 5/2004 | Farris et al. | 2004/0218251 A1 | 11/2004 | Piehl et al. |
| 6,747,785 | B2 | 6/2004 | Chen et al. | 2004/0218334 A1 | 11/2004 | Martin et al. |
| 6,762,873 | B1 | 7/2004 | Coker et al. | 2004/0218341 A1 | 11/2004 | Martin et al. |
| 6,775,174 | B2 | 8/2004 | Huffman et al. | 2004/0223204 A1 | 11/2004 | Mao et al. |
| 6,778,155 | B2 | 8/2004 | Doherty et al. | 2004/0227493 A1 | 11/2004 | Van Brocklin et al. |
| 6,781,643 | B1 | 8/2004 | Watanabe et al. | 2004/0240032 A1 | 12/2004 | Miles |
| 6,787,384 | B2 | 9/2004 | Okumura | 2004/0240138 A1 | 12/2004 | Martin et al. |
| 6,787,438 | B1 | 9/2004 | Nelson | 2004/0245588 A1 | 12/2004 | Nikkel et al. |
| 6,788,520 | B1 | 9/2004 | Behin et al. | 2004/0263944 A1 | 12/2004 | Miles et al. |
| 6,794,119 | B2 | 9/2004 | Miles | 2005/0001828 A1 | 1/2005 | Martin et al. |
| 6,811,267 | B1 | 11/2004 | Allen et al. | 2005/0012577 A1 | 1/2005 | Pillans et al. |
| 6,813,060 | B1 | 11/2004 | Garcia et al. | 2005/0038950 A1 | 2/2005 | Adelmann |
| 6,819,469 | B1 | 11/2004 | Koba | 2005/0057442 A1 | 3/2005 | Way |
| 6,822,628 | B2 | 11/2004 | Dunphy et al. | 2005/0068583 A1 | 3/2005 | Gutkowski et al. |
| 6,829,132 | B2 | 12/2004 | Martin et al. | 2005/0069209 A1 | 3/2005 | Damera-Venkata et al. |
| 6,853,129 | B1 | 2/2005 | Cummings et al. | 2005/0116924 A1 | 6/2005 | Sauvante et al. |
| 6,855,610 | B2 | 2/2005 | Tung et al. | 2005/0206991 A1 | 9/2005 | Chui et al. |
| 6,859,218 | B1 | 2/2005 | Luman et al. | 2005/0286113 A1 | 12/2005 | Miles |
| 6,861,277 | B1 | 3/2005 | Monroe et al. | 2005/0286114 A1 | 12/2005 | Miles |
| 6,862,022 | B2 | 3/2005 | Slupe | 2006/0044246 A1 | 3/2006 | Mignard |
| 6,862,029 | B1 | 3/2005 | D'Souza et al. | 2006/0044298 A1 | 3/2006 | Mignard et al. |
| 6,867,896 | B2 | 3/2005 | Miles | 2006/0044928 A1 | 3/2006 | Chui et al. |
| 6,870,581 | B2 | 3/2005 | Li et al. | 2006/0056000 A1 | 3/2006 | Mignard |
| 6,903,860 | B2 | 6/2005 | Ishii | 2006/0057754 A1 * | 3/2006 | Cummings ................... 438/48 |
| 7,006,276 | B2 * | 2/2006 | Starkweather et al. ...... 359/290 | 2006/0066542 A1 | 3/2006 | Chui |
| 7,123,216 | B1 | 10/2006 | Miles | 2006/0066559 A1 * | 3/2006 | Chui et al. ................... 345/108 |
| 7,161,728 | B2 | 1/2007 | Sampsell et al. | 2006/0066560 A1 | 3/2006 | Gally et al. |

| | | | |
|---|---|---|---|
| 2006/0066561 A1 | 3/2006 | Chui et al. | |
| 2006/0066594 A1 | 3/2006 | Tyger | |
| 2006/0066597 A1 | 3/2006 | Sampsell | |
| 2006/0066598 A1 | 3/2006 | Floyd | |
| 2006/0066601 A1 | 3/2006 | Kothari | |
| 2006/0066937 A1 | 3/2006 | Chui | |
| 2006/0066938 A1 | 3/2006 | Chui | |
| 2006/0067648 A1 | 3/2006 | Chui et al. | |
| 2006/0066653 A1 | 3/2006 | Gally et al. | |
| 2006/0077127 A1 | 4/2006 | Sampsell et al. | |
| 2006/0077145 A1* | 4/2006 | Floyd et al. | 345/85 |
| 2006/0077146 A1* | 4/2006 | Palmateer | 345/85 |
| 2006/0077147 A1* | 4/2006 | Palmateer et al. | 345/85 |
| 2006/0077520 A1 | 4/2006 | Chui et al. | |
| 2006/0103613 A1 | 5/2006 | Chui | |

FOREIGN PATENT DOCUMENTS

| | | |
|---|---|---|
| EP | 0300754 A2 | 1/1989 |
| EP | 0306308 A2 | 3/1989 |
| EP | 0318050 A | 5/1989 |
| EP | 0 417 523 A | 3/1991 |
| EP | 0 467 048 A | 1/1992 |
| EP | 0570906 A | 11/1993 |
| EP | 0608056 A1 | 7/1994 |
| EP | 0655725 A1 | 5/1995 |
| EP | 0 667 548 A1 | 8/1995 |
| EP | 0725380 A1 | 8/1996 |
| EP | 0852371 A1 | 7/1998 |
| EP | 0911794 A1 | 4/1999 |
| EP | 1 017 038 A | 7/2000 |
| EP | 1 146 533 A | 10/2001 |
| EP | 1343190 A | 9/2003 |
| EP | 1345197 A | 9/2003 |
| EP | 1381023 A | 1/2004 |
| EP | 1473691 A2 | 11/2004 |
| FR | 2851683 | 8/2004 |
| GB | 2401200 A | 11/2004 |
| JP | 2004-29571 | 1/2004 |
| WO | WO 95/30924 | 11/1995 |
| WO | WO 97/17628 | 5/1997 |
| WO | WO 99/52006 A3 | 10/1999 |
| WO | WO 01/73937 A | 10/2001 |
| WO | WO 03/007049 A1 | 1/2003 |
| WO | WO 03/015071 A2 | 2/2003 |
| WO | WO 03/044765 A2 | 5/2003 |
| WO | WO 03/060940 A | 7/2003 |
| WO | WO 03/069413 A1 | 8/2003 |
| WO | WO 03/073151 A1 | 9/2003 |
| WO | WO 03/079323 A | 9/2003 |
| WO | WO 03/090199 A1 | 10/2003 |
| WO | WO 2004/006003 A1 | 1/2004 |
| WO | WO 2004/026757 A2 | 4/2004 |
| WO | WO 2004/049034 A1 | 6/2004 |

OTHER PUBLICATIONS

Miles, MEMS-based interferometric modulator for display applications, Part of the SPIE Conference on Micromachined Devices and Components, vol. 3876, pp. 20-28 (1999).

Miles et al., 5.3: Digital Paper™: Reflective displays using interferometric modulation, SID Digest, vol. XXXI, 2000 pp. 32-35.

Peroulis et al., Low contact resistance series MEMS switches, 2002, pp. 223-226, vol. 1, IEEE MTT-S International Microwave Symposium Digest, New York, NY.

Bains, "Digital Paper Display Technology holds Promise for Portables", CommsDesign EE Times (2000).

Lieberman, "MEMS Display Looks to give PDAs Sharper Image" EE Times (2004).

Lieberman, "Microbridges at heart of new MEMS displays" EE Times (2004).

Notice of Reasons for Rejection dated Jun. 1, 2008 in Japanese App. No. 2005-258388.

\* cited by examiner

|  | Column Output Signals | |
|---|---|---|
|  | $+V_{bias}$ | $-V_{bias}$ |
| Row Output Signals  0 | Slowly Releasing $(V_b)$ | Slowly Releasing $(-V_b)$ |
| $+\Delta V$ | Release (0) | Actuate $(-2V_b)$ |
| $-\Delta V$ | Actuate $(2V_b)$ | Release (0) |
FIG. 8
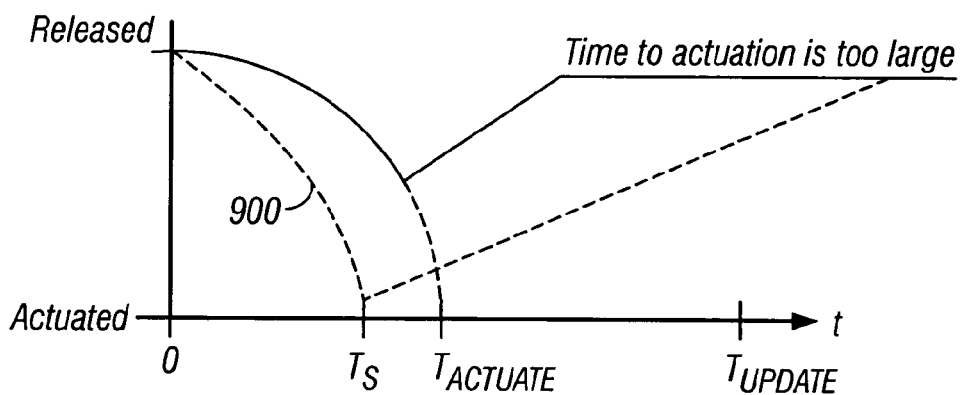
FIG. 9
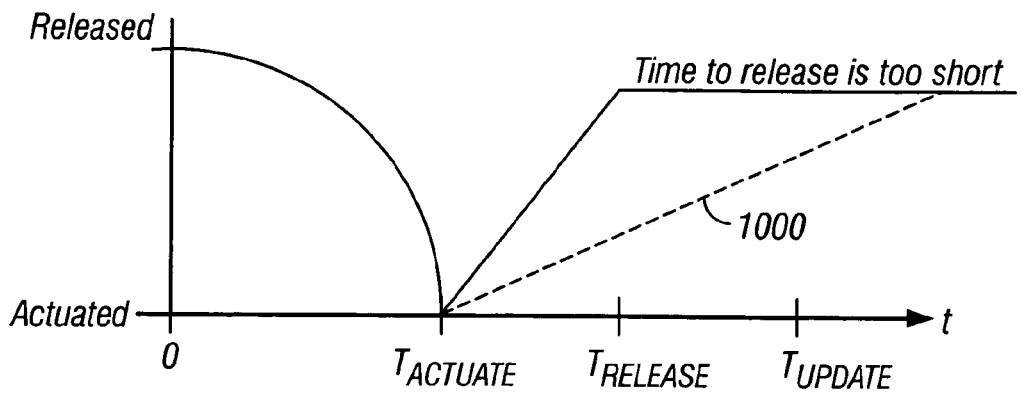
FIG. 10

| | Column Output Signals | |
|---|---|---|
| | $+2V_{bias}$ | $-2V_{bias}$ |
| 0 | Slowly Actuating ($+2V_b$) | Slowly Actuating ($-2V_b$) |
| $+2\Delta V$ | Release (0) | Actuate ($-4V_b$) |
| $-2\Delta V$ | Actuate ($+4V_b$) | Release (0) |
*FIG. 18*
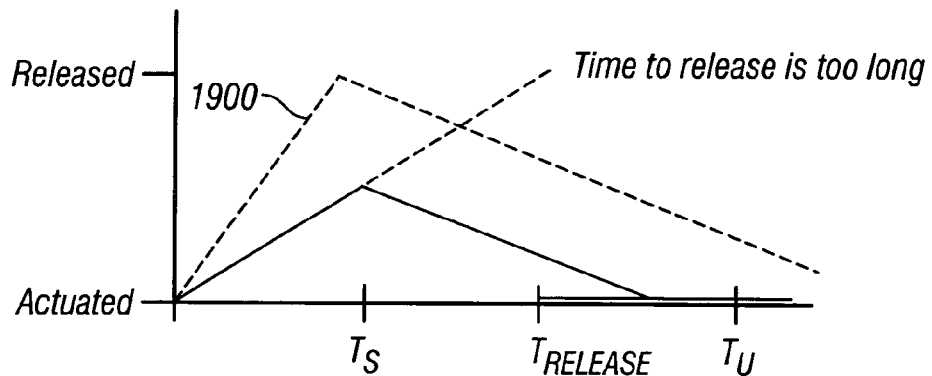
*FIG. 19*
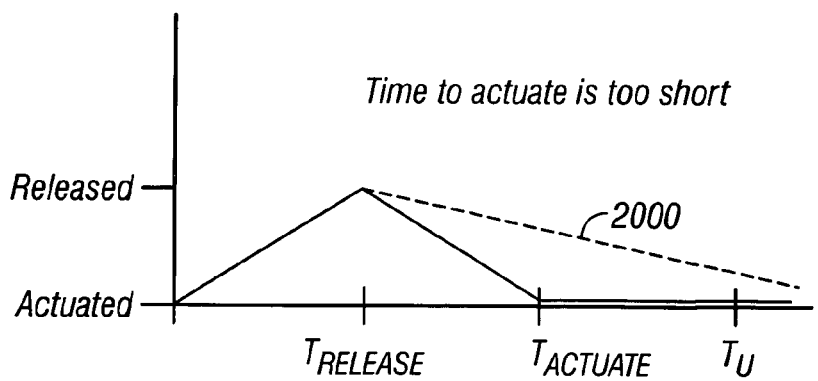
*FIG. 20*

DEVICE AND METHOD FOR DISPLAY MEMORY USING MANIPULATION OF MECHANICAL RESPONSE

CROSS-REFERENCE TO RELATED APPLICATIONS

This application claims the benefit of U.S. Provisional Application No. 60/613,450, filed Sep. 27, 2004, which is incorporated in its entirety by reference herein.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Preferred Embodiments" one will understand how the features of this invention provide advantages over other display devices.

In certain embodiments, a method actuates an array of interferometric modulators multiple times to display a single frame of data. The method comprises receiving a data signal for actuating one or more interferometric modulators during a time period corresponding to a single frame and actuating the interferometric modulator display element with a potential difference such that the interferometric modulator quickly moves to an actuation state. The method further comprises releasing the interferometric modulator display element such that the interferometric modulator slowly drifts away from the actuation state and towards a released state and re-actuating the interferometric modulator display element such that before reaching the released state, the interferometric modulator quickly moves back to the actuation state.

In certain embodiments, a method drives an interferometric modulator element to display a frame of data. The method comprises receiving a data signal for display by the interferometric modulator during a period of time corresponding to a single frame display period and periodically actuating the interferometric modulator display element during the single frame display period wherein the interferometric modulator quickly moves to an actuation state each time the interferometric modulator is actuated and moves slowly away from the actuation state when the potential difference is not applied.

In certain embodiments, a method writes display data to a row of interferometric modulator display elements in an array of display elements. The method comprises writing a first set of display data to the row of the array with a potential difference so as to move at least some of the interferometric modulator elements to an actuated state, releasing the interferometric modulator elements in the row of the array such that the interferometric modulator elements slowly drift away from the actuated state and towards the released state, and re-writing the first set of display data to the row of the array with a potential difference so as to return the interferometric modulator elements to the actuated state before the interferometric modulators reach the released state.

In certain embodiments, a method actuates an array of interferometric modulators multiple times to display a single frame of data. The method comprises receiving a data signal for actuating one or more interferometric modulators during a time period corresponding to a single frame and actuating the interferometric modulator display element with a potential difference such that the interferometric modulator quickly moves to a released state. The method further comprises releasing the interferometric modulator display element such that the interferometric modulator slowly drifts away from the released state and towards an actuated state and re-actuating the interferometric modulator display element such that before reaching the actuated state, the interferometric modulator quickly moves back to the released state.

In certain embodiments, a method drives an interferometric modulator element to display a frame of data. The method comprises receiving a data signal for display by the interferometric modulator during a period of time corresponding to a single frame display period and periodically actuating the interferometric modulator display element during the single frame display period wherein the interferometric modulator quickly moves to a released state each time the interferometric modulator is actuated and moves slowly away from the released state when the potential difference is not applied.

In certain embodiments, a method writes display data to a row of interferometric modulator display elements in an array of display elements. The method comprises writing a first set of display data to the row of the array with a potential difference so as to move at least some of the interferometric modulator elements to a released state, actuating the interferometric modulator elements in the row of the array such that the interferometric modulator elements slowly drift away from the released state and towards the actuated state, and re-writing the first set of display data to the row of the array with a potential difference so as to return the interferometric modulator elements to the released state before the interferometric modulators reach the actuated state.

BRIEF DESCRIPTION OF THE DRAWINGS

FIG. 8 is an illustration of a set of row and column voltages that may be used to drive an interferometric modulator display that results in the modulator drifting to a released state when the row voltage is released.

FIG. 9 illustrates the operational response of a modulator having a long activation time and being driven according to the row and column voltages of FIG. 8.

FIG. 10 illustrates the operational response of a modulator having a short release time and being driven according to the row and column voltages of FIG. 8.

FIG. 18 is an illustration of a set of row and column voltages that may be used to drive an interferometric modulator display that results in the modulator drifting to an actuated state when the row voltage is released.

FIG. 19 illustrates the operational response of a modulator having a long release time and being driven according to the row and column voltages of FIG. 18.

FIG. 20 illustrates the operational response of a modulator having a short actuation time and being driven according to the row and column voltages of FIG. 18.

DETAILED DESCRIPTION OF PREFERRED EMBODIMENTS

An exemplary MEMS interferometric modulator comprises a movable layer and a fixed layer separated by an air gap. A driving scheme employs row/column actuation protocols which maintain voltages to the MEMS interferometric modulator that are above or below the voltage range necessary to place the MEMS interferometric modulator within a "hysteresis window" or "stability window." Stable operation of the MEMS interferometric modulator is achieved by selecting mechanical design features that improve the actuation and release times of the interferometric modulator. In general, features that make the movable layer more compliant result in an increased release time and a decreased actuation time. It has been found that a more compliant movable layer is advantageous when the driving scheme relies at least in part upon the movable layer slowly drifting to a released state when the row voltage is released. Similarly, features that make the movable layer less compliant result in an increased actuation time and a decreased release time. A less compliant movable layer may be advantageous when the driving scheme relies at least in part upon the movable layer slowly drifting to an actuated state when the row voltage is released. Some of the features affecting the release and actuation times include altering post spacing, altering internal stress or tension of the movable layer, altering the thickness or composition of the movable layer, altering the bulkiness of the tethers, perforating the movable layer and providing vias in the fixed layer.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
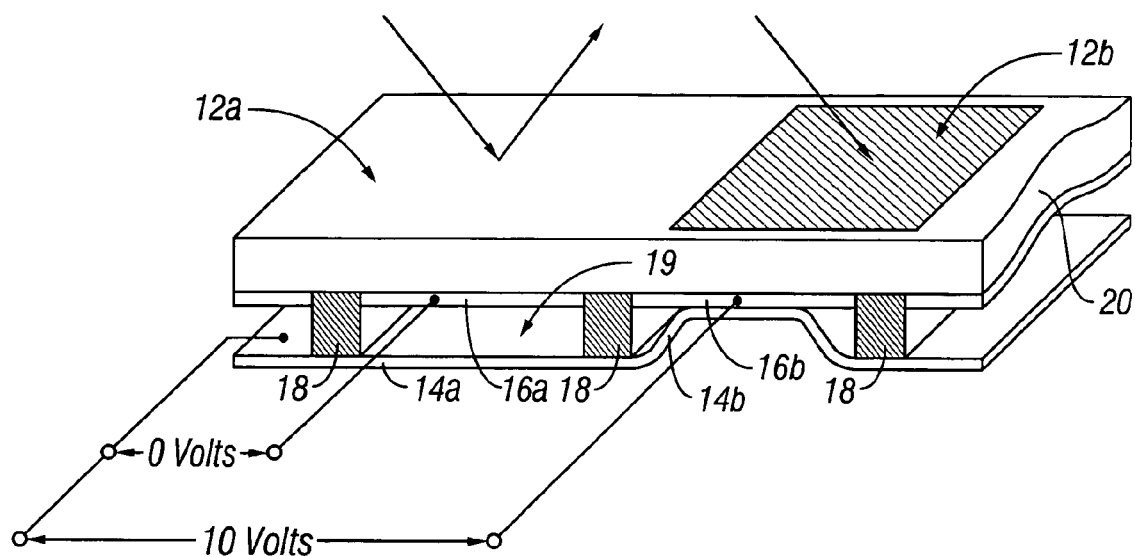
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
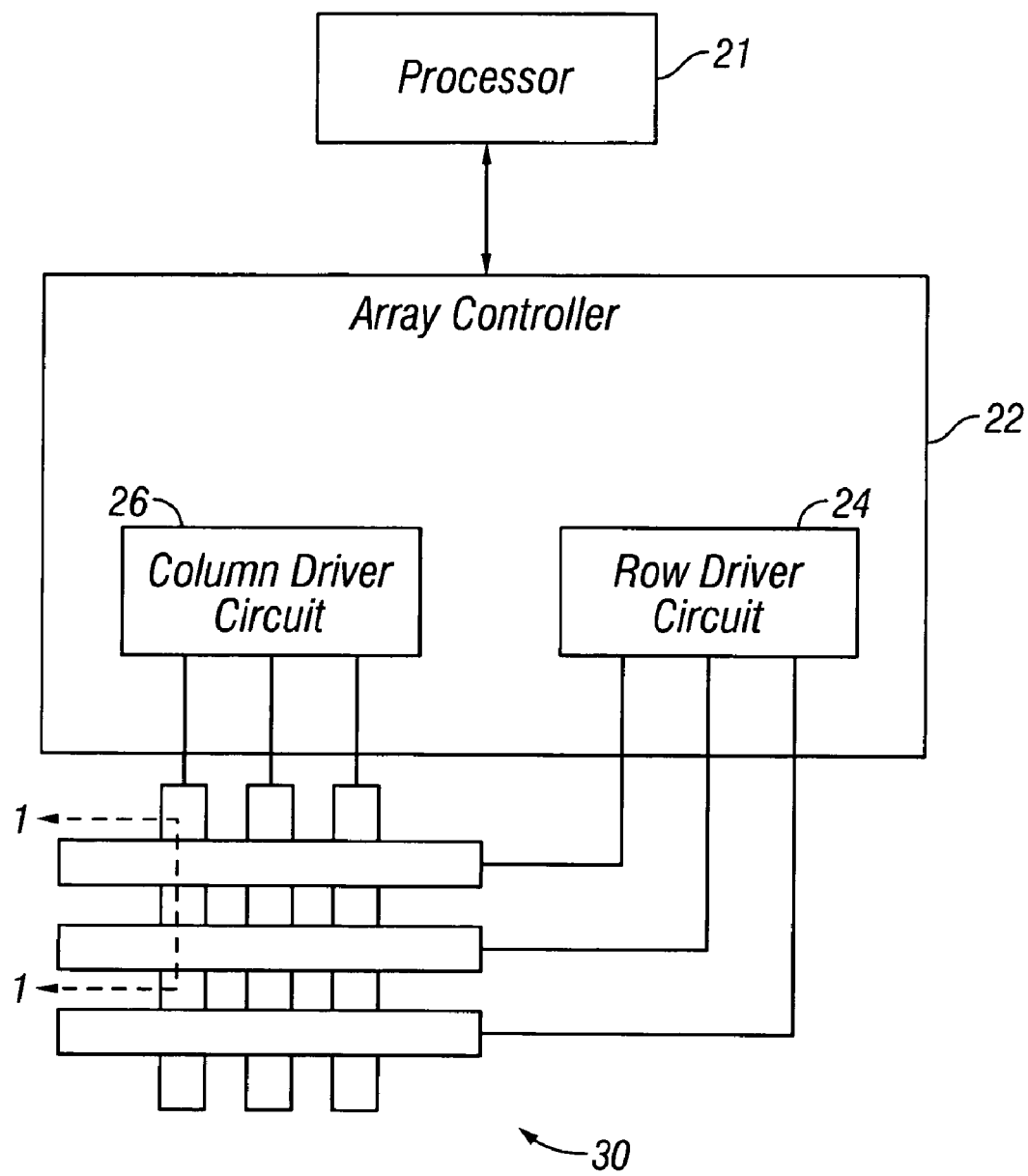
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may or may not take advantage of a hysteresis property of these devices illustrated in FIG. 3. To take advantage of this hysteresis property it may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
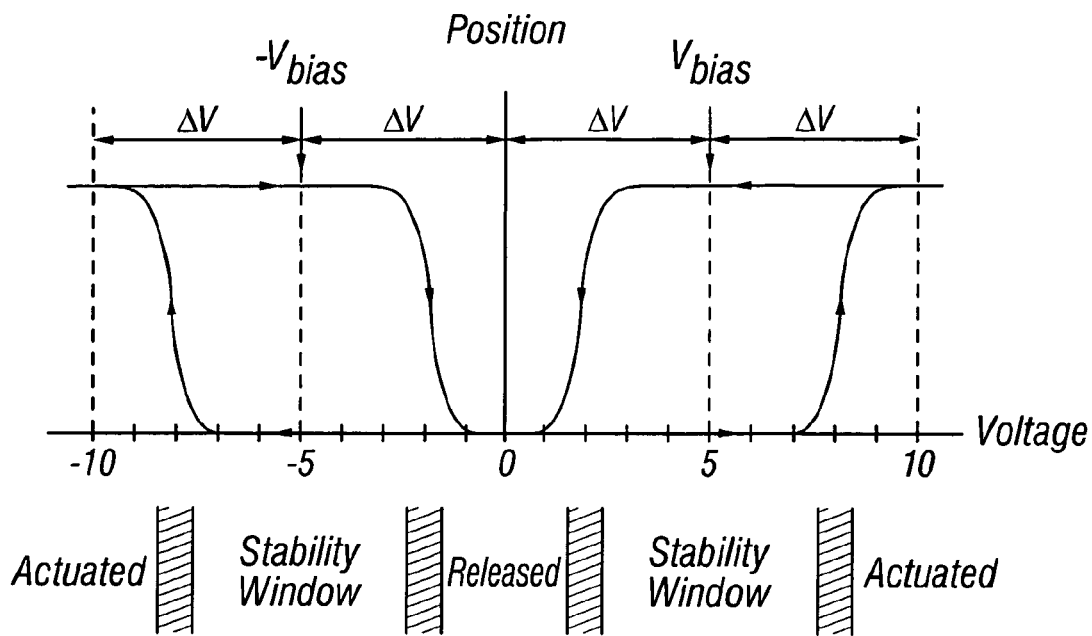
FIG. 3 is a diagram of movable mirror position versus applied voltage for one exemplary embodiment of an interferometric modulator of FIG. 1 that operates within a stability window.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
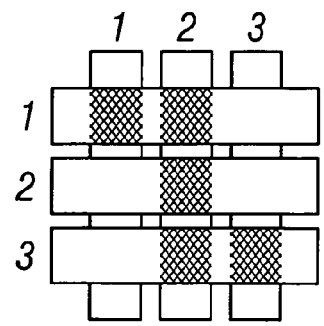
FIGS. 5A and 5B illustrate one exemplary timing diagram for row and column signals that may be used to write a frame of display data to the 3×3 interferometric modulator display of FIG. 2.
Figure 5B:
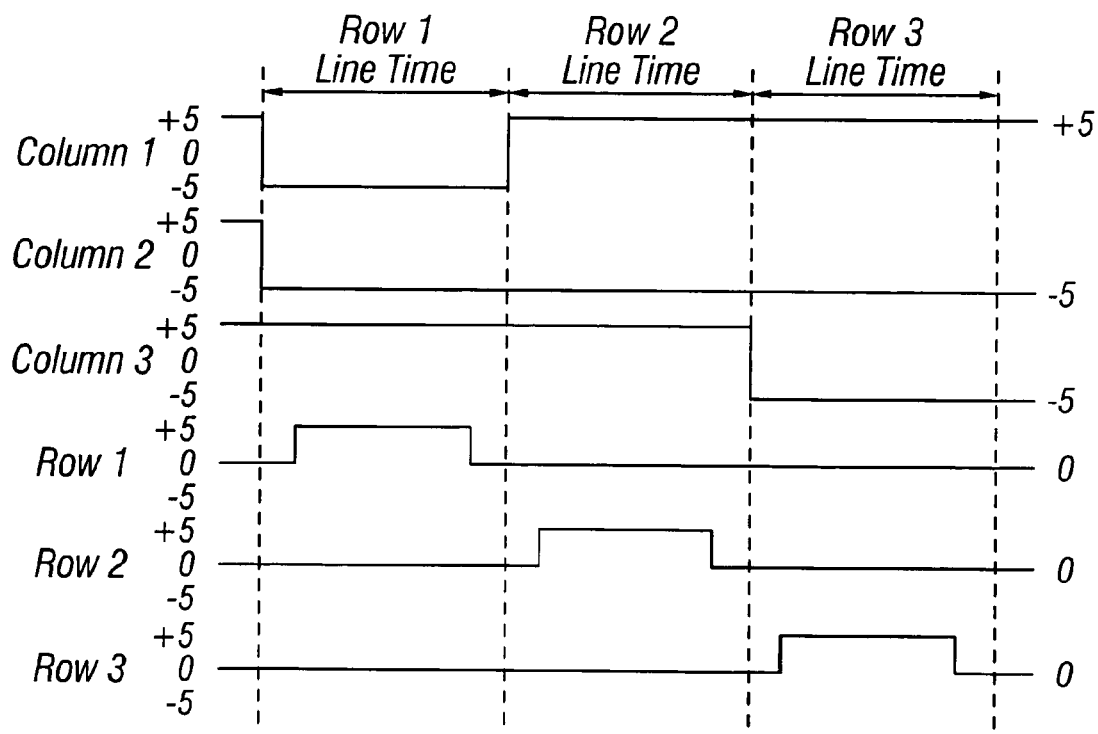

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention. For example, the polarity of the row strobe for a first frame may be reversed for use in the next frame.

Still referring to FIG. 5A, the writing operation sequentially progresses through the each row, from row 1 to row 3 and then returns to write new data on row 1. The time interval between writing data to the modulators of row 1 and the time it takes to return to row 1 to write new data or to rewrite old data to modulators of row 1 is referred to herein as the update time $T_u$. The time interval over which the displayed information remains constant is referred to as the frame period $T_f$. For example, motion video may run at frame rate of 30 Hz, which corresponds to a frame period of 33.3 ms. In one embodiment, the update time $T_u$ is selected to be higher than the frame period $T_f$. In the exemplary embodiment of motion video running at 30 Hz, an update rate is selected as 150 Hz, such that each row of the array is updated 5 times for each unique frame of motion video. This update rate of 150 Hz corresponds to an update time $T_u$ of 6.6 ms. It will be understood by one skilled in the art that the systems described herein are equally applicable to other frame periods and update times and that these are exemplary cases for ease of illustration.

Figure 6A:
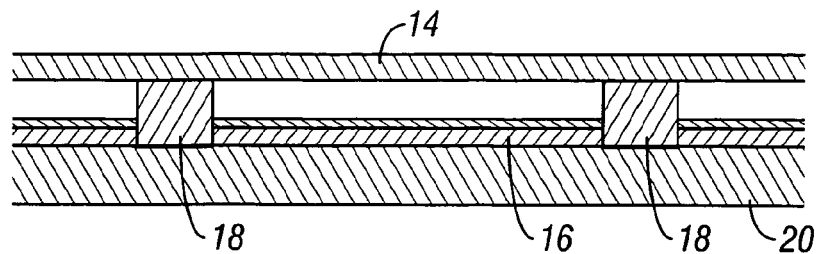
FIG. 6A is a cross section of the device of FIG. 1.
Figure 6B:
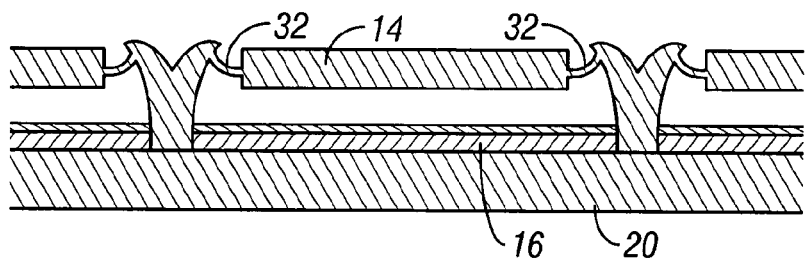
FIG. 6B is a cross section of an alternative embodiment of an interferometric modulator.
Figure 6C:
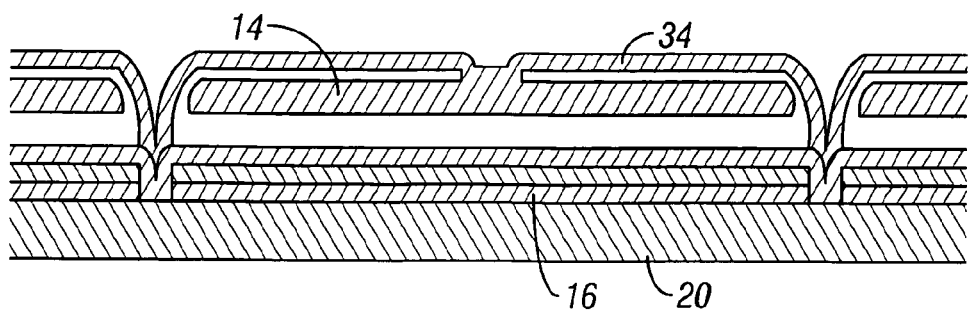
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Figure 7:
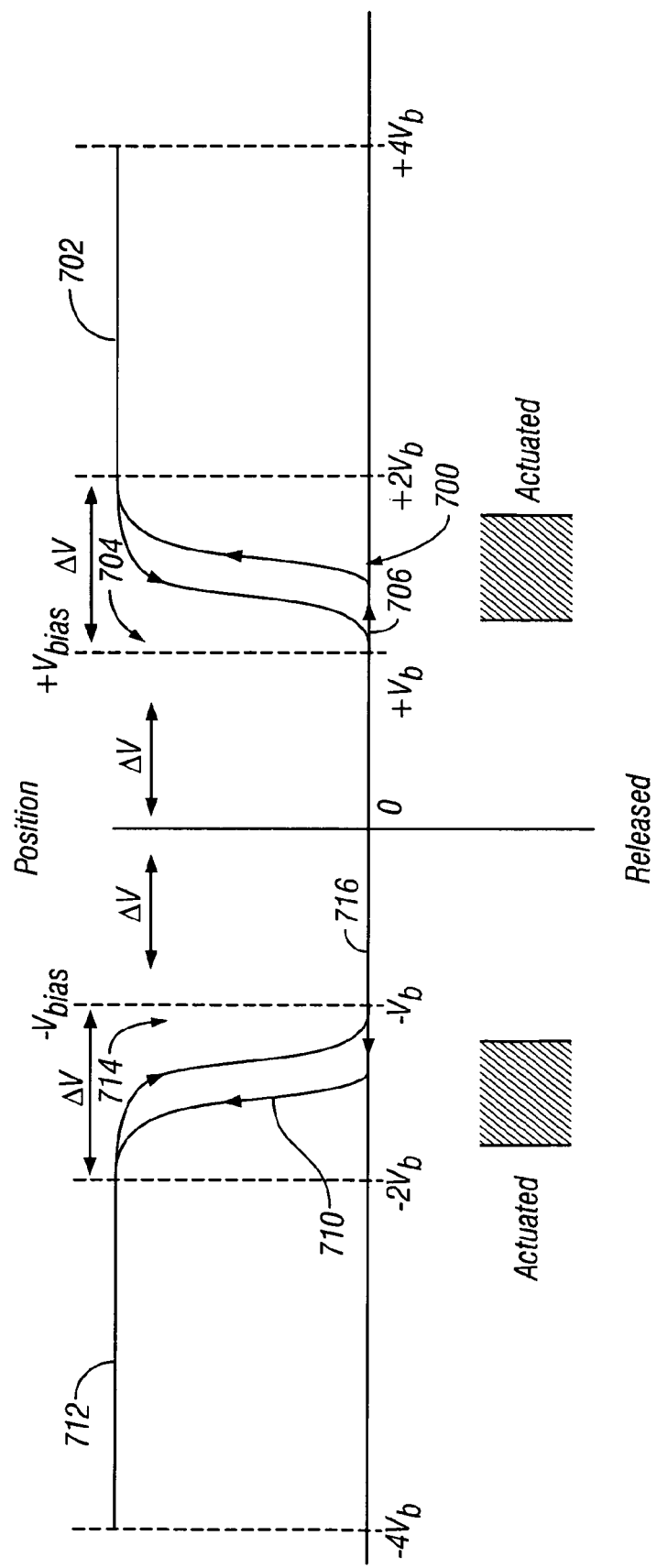
FIG. 7 is a diagram of movable mirror position versus applied voltage for one exemplary embodiment of an interferometric modulator of FIG. 1 that operates without taking advantage of the hysteresis property of the modulator.

FIGS. 7 through 21 illustrate additional processes and systems for using the array of interferometric modulators to those processes and systems illustrated in FIGS. 3 through 5. FIG. 7 is one exemplary diagram of movable mirror position versus applied voltage for one interferometric modulator of FIG. 1 that operates without taking advantage of the hysteresis property of the modulator. Instead, the processes and systems described with reference to FIGS. 7 through 21 employ row/column actuation protocols which maintain voltages to the MEMS interferometric modulators that are always above or below, but not within, "hysteresis window" or "stability window". Exemplary embodiments that operate in accordance with FIG. 7 are described with reference to FIGS. 8 through 10 and 17 and with reference to FIGS. 18 through 21.

Stable operation of the MEMS interferometric modulator is achieved by selecting mechanical design features of the interferometric modulator that optimize the actuation and release times for the particular row/column actuation protocol. Described herein are certain structures and methods of making interferometric modulators having varying release and actuation times. In general, features making the movable layer more compliant result in an increased release time and a decreased actuation time. Similarly, features that make the movable layer less compliant result in an increased actuation time and a decreased release time.

An exemplary row/column actuation protocol described with reference to FIG. 8 operates the modulator in the released region of FIG. 7 between row strobes. Another exemplary row/column actuation protocol described with reference to FIG. 18 operates the modulator in the actuated region of FIG. 7 between row strobes. Other combinations of modulator design and driving scheme may be employed to operate the modulator in different regions of FIG. 7 without relying upon a hysteresis window.

The protocols described with reference to FIGS. 7 through 21 advantageously operate the MEMS interferometric modulator at lower voltages than the voltages employed with the processes and systems described with reference to FIGS. 3 through 5. For example, the row/column actuation protocols described with reference to FIGS. 3 through 5 apply an exemplary voltage range from 0 volts to ±10 volts. In contrast, the row/column actuation protocols disclosed with reference to FIGS. 7 through 21 apply lower voltages. For example, the row/column actuation protocol described with reference to FIGS. 8 through 10 and 17 employs a range of $-2V_{bias}$ volts to $+2V_{bias}$ volts where $V_{bias}=1$ volt. The row/column actuation protocol described with reference to FIGS. 18-21 employs a range of $-4V_{bias}$ volts to $+4V_{bias}$ volts where $V_{bias}=0.5$ volt. With such low bias voltages, the hysteresis window is very narrow, so drive methods which do not utilize voltages within the hysteresis window are advantageous.

Operating the MEMS interferometric modulator with lower voltage row/column actuation protocols may increase the efficiency of a display device employing the MEMS device. Advantageously for portable display devices, the storage capacity of the battery power source may be reduced while maintaining the display device's operating time as compared to display devices that operate over a wider voltage range of, for example, 20 volts. The voltage range of 4 volts is only exemplary and other voltage ranges may be employed that are lower than the typical 20 volt range while staying within the scope of the invention. For the embodiment described with reference to FIG. 8, $V_{bias}$ lies within the released region of FIG. 7. For the embodiment described with reference to FIG. 18, $V_{bias}$ lies within the actuated region of FIG. 7. While exemplary values for $V_{bias}$ such as 1 volt and 0.5 volts have been described, other values of $V_{bias}$ are within the scope of the invention. In these embodiments, the narrowness of the hysteresis window results in the row/column actuation protocol operating the interferometric modulator substantially outside of the hysteresis window at all times.

The embodiment described with reference to FIGS. 7 through 10 operates the array of MEMS interferometric modulators without relying upon the hysteresis property of the interferometric modulator. In FIG. 7, the inverse of the intensity is plotted against the voltage between the column and row electrodes of the modulator. Starting at 0 and moving right in the direction of a positive voltage applied between the column and row electrodes, the intensity of the light displayed is at maximum with the modulator cavity 19 fully open until the applied voltage reaches the voltage represented by point 700. At this point, the potential between the column and row electrodes is sufficient to begin to collapse the cavity 19 of the modulator, which will result in the modulator displaying black or reflecting a minimum intensity of light. At point 702, the modulator is displaying black. As this voltage is reduced from point 702, the modulator will continue to display black until point 704, where the electromechanical forces of the modulator will begin to outweigh the electrical potential being applied. Continuing to reduce the potential between the column and row electrodes will result in the intensity of the light displayed to increase until, at point 706, the cavity 19 of the modulator is fully open and the light displayed is at maximum intensity.

In the case of a negative potential being applied between the column and row electrode, starting at 0 and moving left in the direction of a negative voltage applied between the column and row electrodes, the intensity of the light displayed is at maximum with the modulator cavity 19 fully open until the applied voltage reaches the voltage represented by point 710. At this point, the potential between the column and row electrodes is sufficient to begin to collapse the cavity 19, which will result in the modulator displaying black or reflecting a minimum intensity of light. At point 712, the modulator is displaying black. As this potential is reduced from point 712 (moving back to the right), the modulator will continue to display black until point 714, where the electromechanical forces of the modulator will begin to outweigh the electrical potential being applied the modulator. Continuing to reduce the potential between the column and row electrodes will result in the intensity of the light displayed to increase until, at point 716, the cavity 19 of the modulator is fully open and the light displayed is again at maximum intensity.

FIG. 8 is an illustration of a set of row and column voltages that may be used to drive an interferometric modulator display that results in the modulator drifting to a released state between row strobes. In the exemplary embodiment, the row select signal takes on the values of $+\Delta V$ or $-\Delta V$ during a row strobe and the row select signal takes on a value of 0 between the row strobes. When a row is strobed with a $-\Delta V$ signal, the data takes on the value of $+V_{bias}$ to actuate the modulator collapsing the cavity 19 or $-V_{bias}$ to release the modulator which opens the cavity 19. When a row is selected with a $+\Delta V$ signal, the column takes on the value of $-V_{bias}$ to actuate the modulator or $+V_{bias}$ to release the modulator. In the present embodiment, between row strobes, the row voltage is set to 0. During these periods, the column signal taking on the values of $+V_{bias}$ and $-V_{bias}$ will result in the modulator slowly releasing.

FIG. 9 illustrates the operational response of a modulator having a long actuation time and being driven according to the row and column voltages of FIG. 8. At t=0, the interferometric modulator is actuated by a potential expressed between the column and row electrodes. This voltage will only be applied during the time interval that the row electrode has an enabling voltage applied to it, referred to herein as $T_S$, as described above. When the row strobe is over, the modulators in that row will gradually migrate to the released position under the mechanical restoring forces of the moving electrode. If the actuation time $T_A$ exceeds $T_S$ as is the case illustrated by the solid line in FIG. 9, then the modulator will not fully actuate and may drift back to the released position when the voltage is removed from the row electrode. Preferably, the actuation time $T_A$ is the same as or less than $T_S$ such that the operational response follows line 900.

FIG. 10 illustrates the operational response of a modulator having a short release time and being driven according to the row and column voltages of FIG. 8. If the release time is too short, the modulator may get fully actuated as illustrated in FIG. 10. However, the mechanical forces cause the modulator to open too quickly, which results in the maximum intensity being incorrectly displayed for a significant portion of the update interval. Preferably, the release time $T_R$ is the same as or greater than update time $T_u$ such that the operational response follows line 1000.

FIGS. 11 through 16 illustrate methods and structures for optimizing the release and actuation times of an interferometric modulator. FIGS. 11A and 11B illustrate a geometric variation in post 18 spacing that affects the actuation and release times of the modulator so as to improve the operational response of the modulator. By increasing the distance between posts 18, the release time of the modulator is increased and the actuation time is decreased. In FIG. 11A, the posts 18 of the modulator are set a distance W apart from one another. In FIG. 11B, by increasing the distance between the posts 18 to W+Δ, the release time is increased and the actuation time is decreased.

Figure 12A:
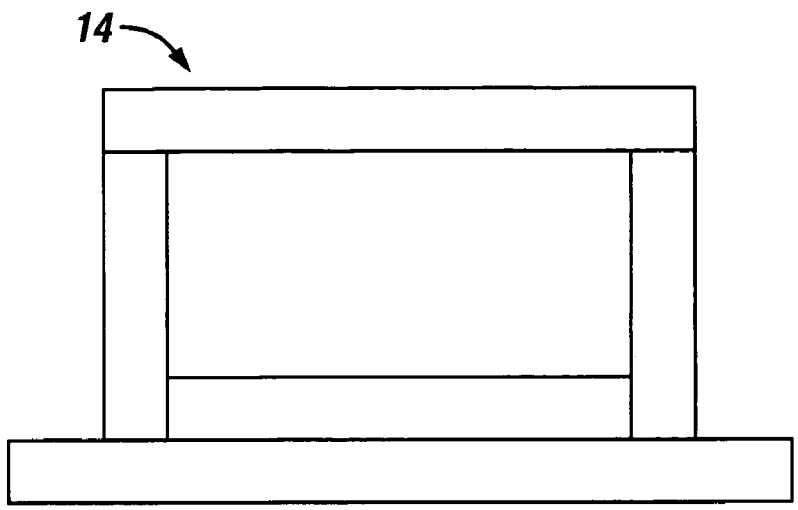
FIGS. 12A and 12B illustrate a geometric variation in tension of the movable layer that affects the actuation and release times of the modulator so as to improve the operational response of the modulator.
Figure 12B:
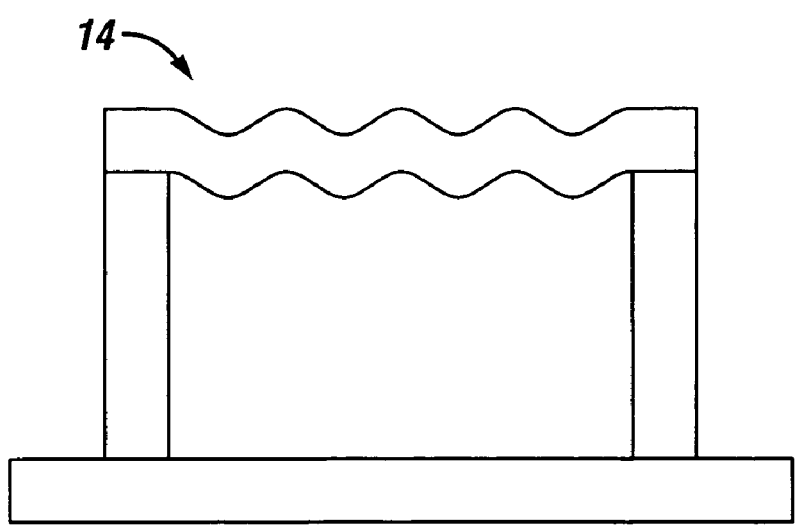

FIGS. 12A and 12B illustrate a geometric variation in tension of the movable layer 14 that affects the actuation and release times of the modulator so as to improve the operational response of the modulator. By reducing the stress or tension in the movable layer 14, the release time is increased and the actuation time is decreased. Stress in the movable layer 14 can be induced in many ways such as the material used, temperature cycling, method of deposition, and so on. For example, the tension in the movable layer 14 may be decreased by increasing the power or the gas pressure during the deposition process forming the movable layer 14. In FIG. 12A, the movable layer 14 is under stress and tension. In FIG. 12B, the stress is reduced (represented by the wavy nature of the movable layer 14). The reduced tension in the movable layer 14 will result in an increased release time and a decreased actuation time.

Figure 13A:
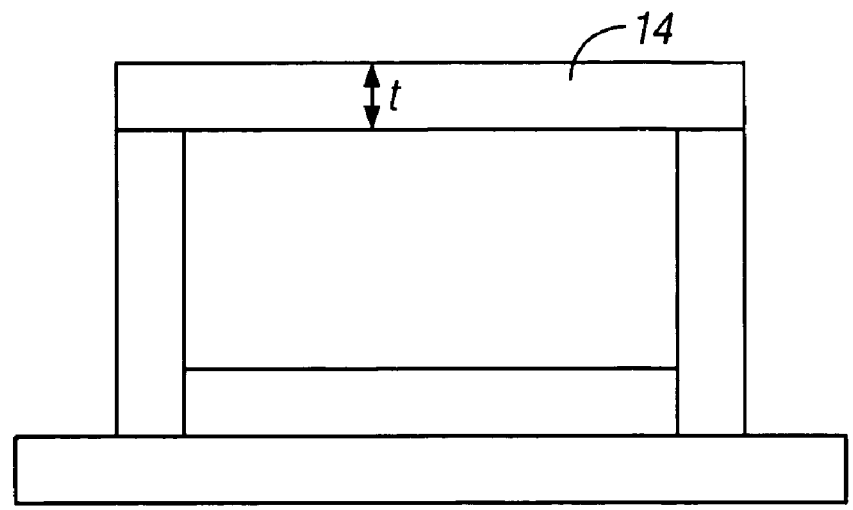
FIGS. 13A and 13B illustrate a geometric variation in thickness of the movable layer that affects the actuation and release times of the modulator so as to improve the operational response of the modulator.
Figure 13B:
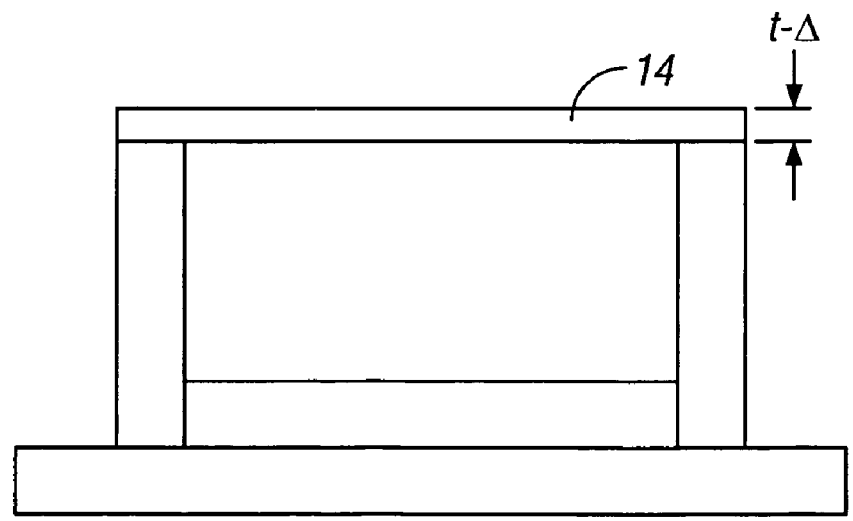

FIGS. 13A and 13B illustrate a geometric variation in thickness of the movable 14 layer that affects the actuation and release times of the modulator so as to improve the operational response of the modulator. Reducing the thickness of the movable layer 14 also increases the release time of the modulator while decreasing the actuation time of the modulator. In FIG. 13A, the thickness of the movable layer 14 is t. In FIG. 13B, the thickness of the movable layer 14 is reduced to t–Δ, which increases the release time of the modulator and decreases the actuation time of the modulator. Alternatively or in addition, the material composition of the movable layer 14 can be changed to a more pliant material, which will also increase the release time of the modulator and decrease the actuation time of the modulator. For example, materials such as aluminum/aluminum alloys, oxides with metal, chrome, and nickel could be used for the movable layer 14 with the later materials being less compliant.

Figure 14A:
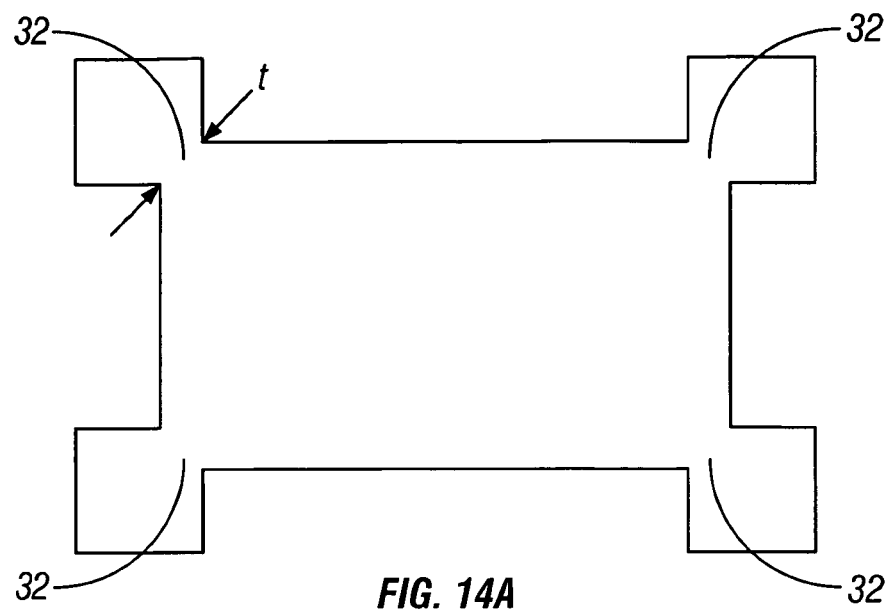
FIGS. 14A and 14B illustrate a geometric variation in tether size of the movable layer that affects the actuation and release times of the modulator so as to improve the operational response of the modulator.
Figure 14B:
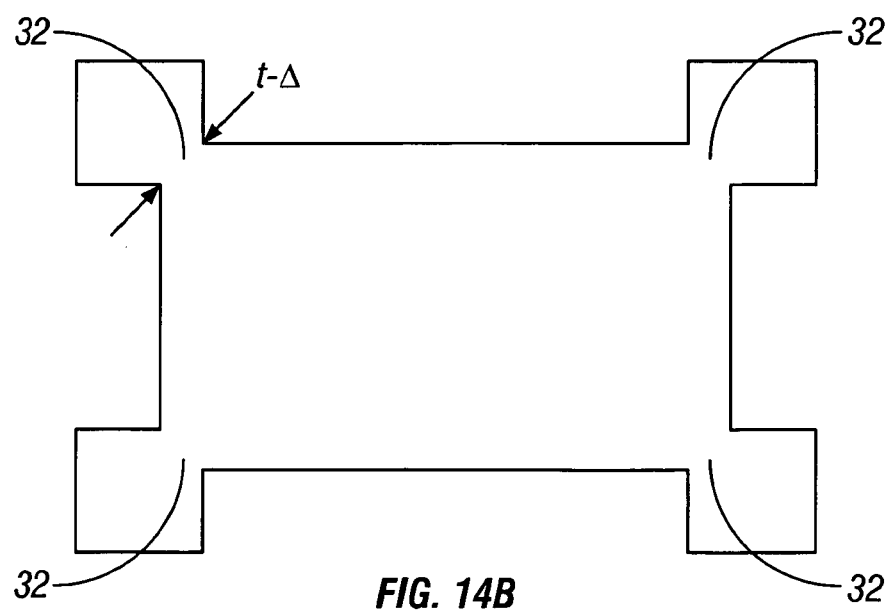

FIGS. 14A and 14B illustrate a geometric variation in tether 32 size of the movable layer 14 that affects the actuation and release times of the modulator so as to improve the operational response of the modulator. FIGS. 14A and 14B are top down representation of the movable layer 14. As explained above, the tethers 32 connect the movable layer 14 to the posts 18 of an interferometric modulator. By reducing the bulkiness of the tethers 32, the resiliency of the movable layer 14 is reduced which in turn results in an increase in the release time of the modulator and a decrease in the actuation time of the modulator. In FIG. 14B the size of the tethers 32 is reduced so as to increase the release time of the modulator and decrease the actuation time of the modulator.

Figure 15A:
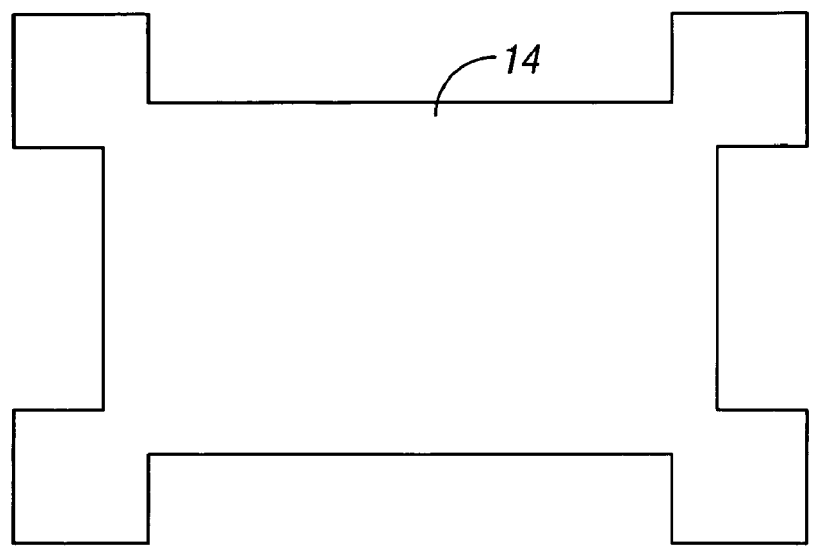
FIGS. 15A and 15B illustrate a geometric variation in the movable layer that affects the actuation and release times of the modulator so as to improve the operational response of the modulator.
Figure 15B:
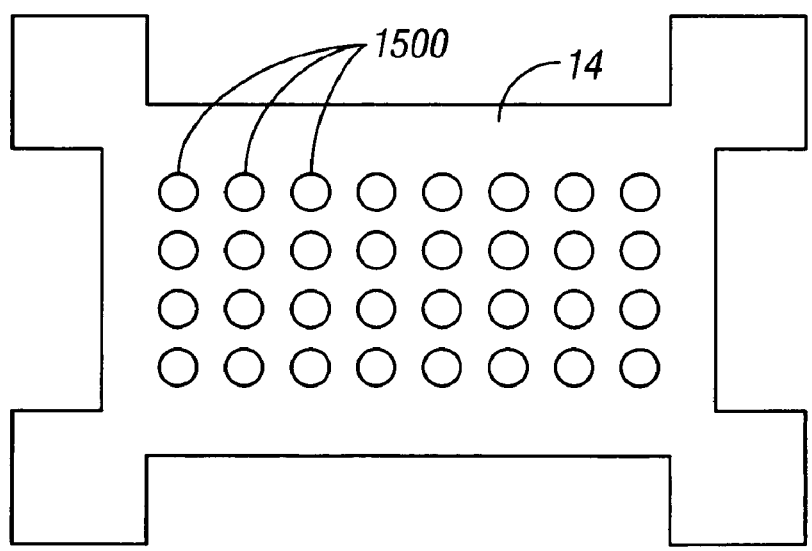

FIGS. 15A and 15B illustrate a geometric variation in the movable layer 14 that affects the actuation and release times of the modulator so as to improve the operational response of the modulator. When the modulator is actuated and the cavity 19 is collapsed, air is forced out of the cavity 19. By perforating the movable layer 14, the air is allowed to pass out of the cavity 19 through the movable layer 14, resulting in a decrease of the actuation time. In FIG. 15A a solid movable layer 14 is illustrated. In FIG. 15B, the movable layer 14 includes one or more perforations 1500 so as to decrease the actuation time of the modulator. This will also increase the release time, because the air pressure that would have built up beneath the collapsed movable layer 14 has been discharged.

Figure 16A:
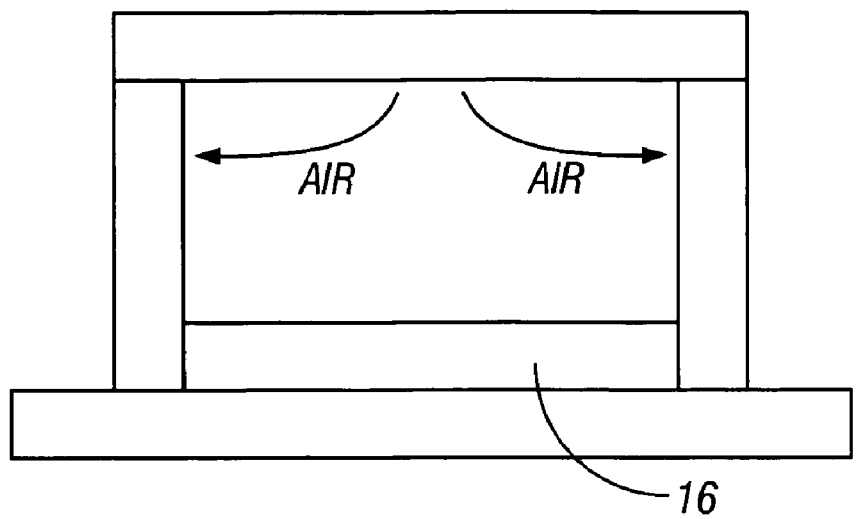
FIGS. 16A and 16B illustrate a geometric variation in the surface of the fixed layer that affects the actuation and release times of the modulator so as to improve the operational response of the modulator.
Figure 16B:
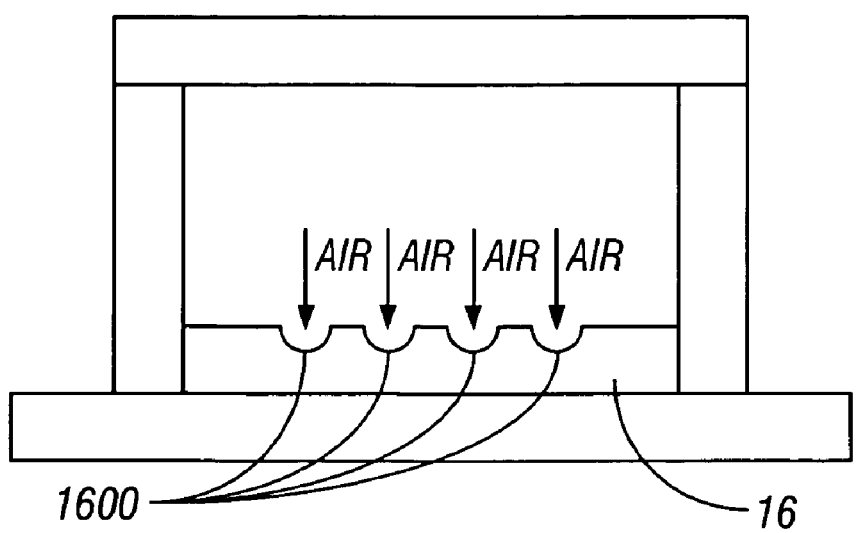

FIGS. 16A and 16B illustrate a geometric variation in the surface of the fixed layers 16 that affects the actuation and release times of the modulator so as to improve the operational response of the modulator. FIG. 16B illustrates vias 1600 in the fixed layer 16. The vias 1600 give the air in the cavity 19 a place to go when the cavity 19 is collapsed, thus reducing the actuation time. In addition, the reduction in upward pressure from compressed air in the collapsed cavity 19 increases the release time of the modulator. It will be understood that any combination of the methods above can also be used to achieve the desired end result.

Figure 17:
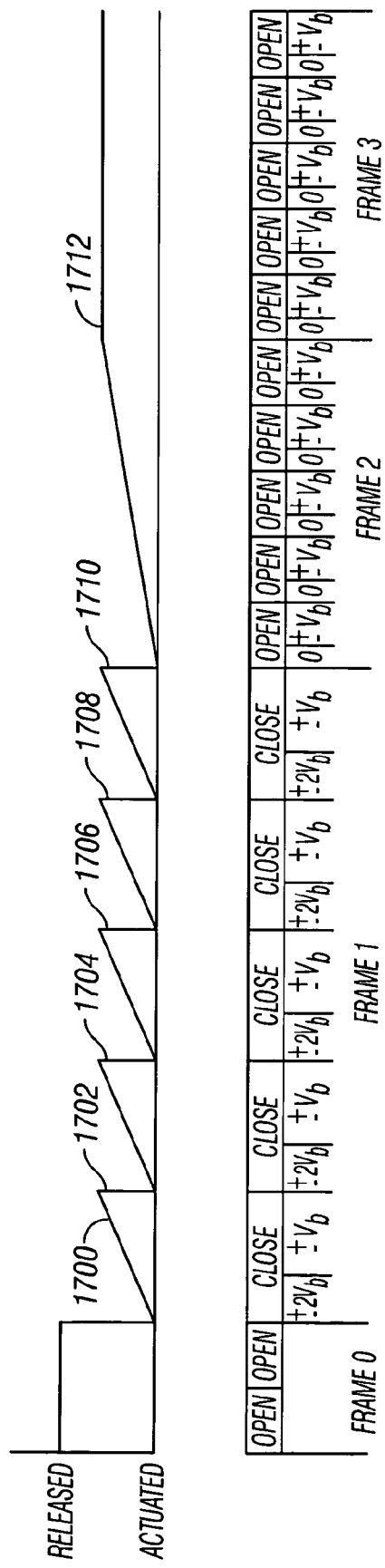
FIG. 17 illustrates the timing effects of motion video in an array of modulators driven according to the row and column voltages of FIG. 8 so as to drift to a released state when the row select is removed.

FIG. 17 illustrates the timing effects of motion video in an array of modulators driven according to the row and column voltages of FIG. 8 so as to drift toward a released state when the row select is removed. In this exemplary embodiment, the motion video is displayed at 30 frames per second (30 Hz), thus, the frame time is 33.3 ms. In this exemplary embodiment, rows are updated five times per frame at a rate of 150 Hz ($T_U$=6.6 ms). In this example, the modulator has been tuned to have a very fast actuation time and a long release time of 30 ms by one or a combination of the methods described with reference to FIGS. 11 through 16. The subframe updates in the form of commands to a particular modulator are provided above the frame numbers. These commands are presented in the form of open and close commands, which correspond to voltages applied to the row and column electrodes of the modulator which respectively release and actuate the modulator. These voltages are provided below the commands in FIG. 17. The cavity 19 size is illustrated directly above the subframes to illustrate the cavity 19 thickness at all times during operation.

The sequence begins with the last two update subframes of Frame 0. The modulator is in steady state with the cavity 19 at maximum aperture. At the start of Frame 1, the modulator is instructed to actuate. The cavity 19 is collapsed at point 1700. As the row pulse is removed from the modulator and the remaining lines are scanned, the cavity 19 will drift open a certain amount. After $T_U$ (6.6 ms) later, the actuation voltage again is applied driving the modulator into a state of maximum actuation. This occurs five times during the display of Frame 1 at points labeled 1702, 1704, 1706, 1708 and 1710.

During Frame 2, the modulator is written to the open position with the potential between the row and column electrodes being about 0 during the row strobes. The modulator releases over the next 30 ms to reach its maximum aperture size at point 1712. Frame 3 also displays the modulator in the open state. Thus the modulator at the open state will remain as such for the entirety of Frame 3. If the modulator were actuated in Frame 4, the process described with respect to Frame 1 would repeat.

FIG. 18 is an illustration of a set of row and column voltages that may be used to drive an interferometric modulator display that results in the modulator drifting to an actuated state between row strobes. In contrast to the row/column actuation protocol of FIG. 8 which results in the modulator drifting to a released state, by altering the display driving strategy and the actuation and release times of the modulator, the natural state of the modulator is the actuated state such that the modulators will drift toward an actuated condition between row updates. The driving strategy applies row voltages and data combinations such that the when the row is not being strobed the modulator will be driven to an actuated state and when the row is strobed the modulators in that row can be written to a released state. This row/column actuation protocol has characteristics that are the converse of those present in the embodiment described with reference to FIGS. 8-10 and 17.

FIG. 19 illustrates the operational response of a modulator having a long release time and being driven according to the row and column voltages of FIG. 18. FIG. 19 assumes the same optical response as illustrated in FIG. 7. In FIG. 19, if the release time is too long then the modulator will not be released during the period of time in which the row is enabled. The modulator in this embodiment will drift toward the actuated state and will assume the actuated state in the interval prior to the rewriting of the modulator state. Preferably, the release time $T_R$ is the same as or shorter than $T_S$ such that the operational response follows line 1900.

FIG. 20 illustrates the operational response of a modulator having a short actuation time and being driven according to the row and column voltages of FIG. 18. In FIG. 20, the actuation time is too short, so following the successful release of the modulator, the modulator drifts too rapidly to the actuated state displaying the incorrect optical response for an unacceptable fraction of the update period. Preferably, the actuation time $T_A$ is the same as or longer than update time $T_U$ such that the operational response follows line 2000.

Figure 11A:
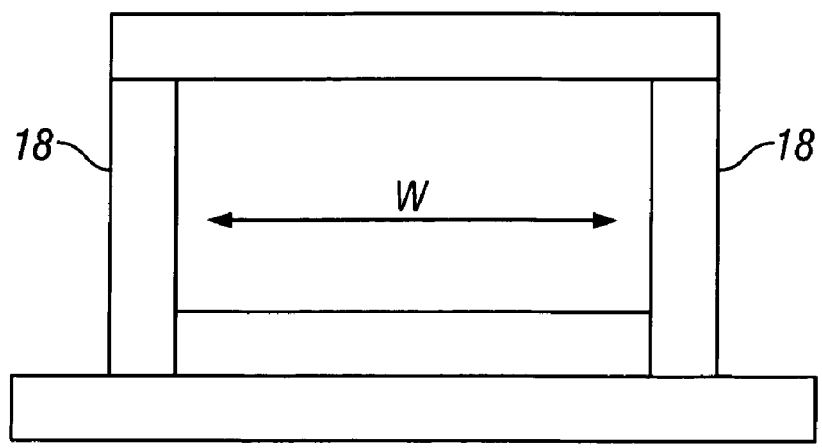
FIGS. 11A and 11B illustrate a geometric variation in post spacing that affects the actuation and release times of the modulator so as to improve the operational response of the modulator.
Figure 11B:
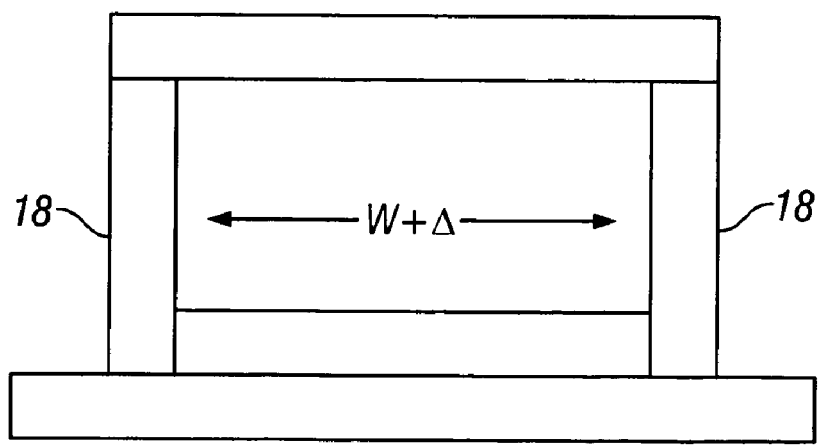

It is desired to increase the actuation time and decrease the release time for the modulator having the optical response illustrated in FIGS. 19 and 20 when driven by the row and column voltages illustrated in FIG. 18. This is done by the converse of the methods described with respect to FIGS. 11 through 16. Specifically, the goals of increasing the actuation time and decreasing the release time can be achieved by: decreasing the post spacing as illustrated in FIG. 11A; increasing the tension of the movable layer 14 as illustrated in FIG. 12A; increasing the thickness of the movable layer 14 as illustrated in FIG. 13A; using a less flexible material in the formation of the movable layer 14, increasing the bulkiness of the tethers 32 as illustrated in FIG. 14A; using solid materials in the formation of the movable layer 14 as illustrated in FIG. 15A; and using a uniformly flat solid layer in the fixed layer 16. It will be understood that any combination of the methods above can also be used to achieve the desired end result.

Figure 21:
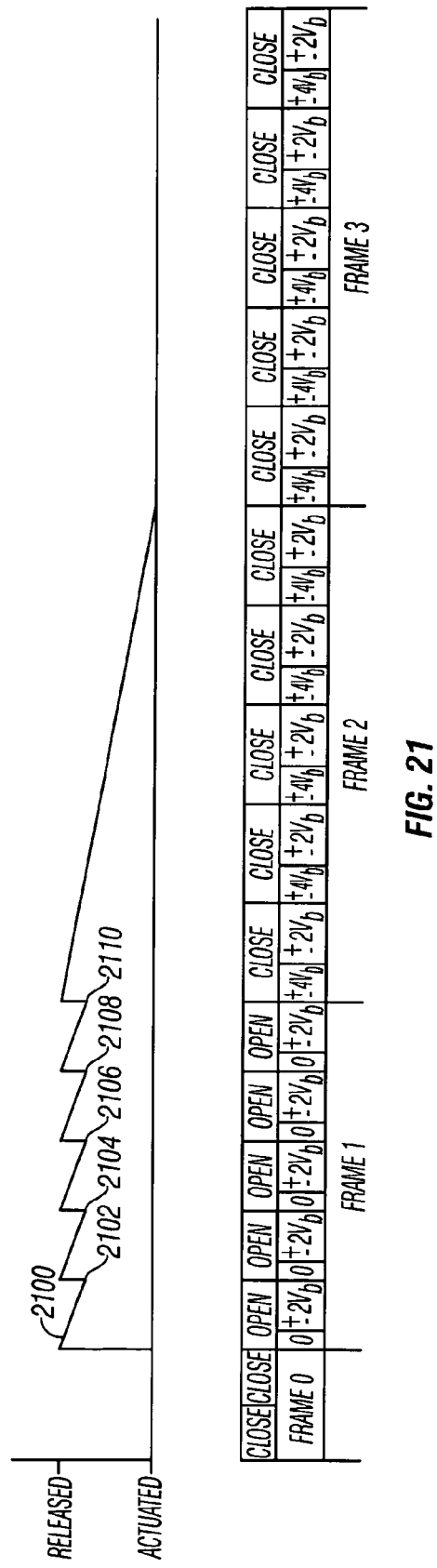
FIG. 21 illustrates the timing effects of motion video in an array of modulators driven according to the row and column voltages of FIG. 18 so as to drift to an actuated state when the row select is removed.

FIG. 21 illustrates the timing effects of motion video in an array of modulators driven according to the row and column voltages of FIG. 18 so as to drift to an actuated state when the row select is removed. In this exemplary embodiment, the motion video is displayed at 30 frames per second (30 Hz), thus, the frame time is 33.3 ms. In this exemplary embodiment, rows are updated five times per frame at a rate of 150 Hz ($T_U$=6.6 ms). In this example, the modulator has been tuned to have a very fast release time and a long actuation time of 30 ms by one or a combination of the methods described with reference to FIGS. 11-16. The subframe updates in the form of commands to a particular modulator are provided above the frame numbers. These commands are presented in the form of open and close commands which correspond to voltages applied to the row and column electrodes of the modulator which respectively release and actuate the modulator. These voltages are provided below the commands in FIG. 21. The cavity 19 size is illustrated directly above the subframes to illustrate the cavity 19 thickness at all times during the operation.

The sequence begins with the last two subframes of Frame 0. The modulator is in steady state with the cavity 19 at minimum aperture. At the start of Frame 1, the modulator is instructed to release. The cavity 19 is opened at point 2100. As the row select pulse is removed from the modulator, and the remaining lines are scanned, the cavity 19 will drift closed by a small amount. After $T_U$ (6.6 ms) later, the release voltage is reapplied driving the modulator into the release state. This occurs five times during the display of Frame 1 at points labeled 2102, 2104, 2106, 2108 and 2110. These correspond to the row update points for the array.

During Frame 2, the modulator is written to the open position with the potential between the row and column electrodes removed. The modulator releases over the next 30 ms taking almost the entire frame duration to reach its maximum aperture size at point 2112. Frame 3 also displays the modulator in the actuated state. Thus the modulator at the closed state will remain as such for the entirety of Frame 3. If the modulator were released in Frame 4, the process as described with respect to Frame 1 would repeat.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of actuating an array of interferometric modulators multiple times to display a single row of data, the method comprising:

receiving a data signal for actuating one or more interferometric modulators during a time period corresponding to a single row;

actuating the one or more interferometric modulators with a potential difference such that the one or more interferometric modulators moves to an actuation state;

releasing the one or more interferometric modulators such that the one or more interferometric modulators drifts away from the actuation state and towards a released state; and re-actuating the one or more interferometric modulators such that before reaching the released state, the one or more interferometric modulators moves back to the actuation state.

2. The method of claim 1 further comprising applying a bias voltage to the one or more interferometric modulators while the one or more interferometric modulator drift away from the actuation state.

3. The method of claim 2, wherein the potential difference is substantially equal to twice the bias voltage.

4. The method of claim 2, wherein an absolute value of the bias voltage is less than an absolute value of a voltage corresponding to a hysteresis window for the one or more interferometric modulators.

5. A method of driving an interferometric modulator to display a row of data, the method comprising:

receiving a data signal for display by the interferometric modulator during a period of time corresponding to a single row display period; and actuating the interferometric modulator during the single row display period such that the interferometric modulator moves to an actuation state;

releasing the interferometric modulators such that one or more of the interferometric modulators drifts away from the actuation state and towards a released state; and re-actuating the interferometric modulators such that before reaching the released state, the one or more of the interferometric modulators moves back to the actuation state.

6. The method of claim 5 further comprising applying a bias voltage to the interferometric modulator while the interferometric modulator moves away from the actuation state.

7. The method of claim 6, wherein the potential difference is substantially equal to twice the bias voltage.

8. The method of claim 6, wherein an absolute value of the bias voltage is less than an absolute value of a voltage corresponding to a hysteresis window for the interferometric modulator.

9. A method of writing display data to a row of interferometric modulators in an array of display elements, the method comprising:

writing a first set of display data to the row of interferometric modulators with a potential difference so as to actuate at least some of the interferometric modulators such that the at least some of the interferometric modulators move to an actuated state;

releasing the at least some of the interferometric modulators in the row of interferometric modulators such that the at least some of the interferometric modulators drift away from the actuated state and towards a released state; and re-actuating the at least some of the interferometric modulators such that before the at least some of the interferometric modulators reach the released state, the at least some of the interferometric modulators move back to the actuated state.

10. The method of claim 9 further comprising applying a bias voltage to the at least some of the interferometric modulators in the row of interferometric modulators while the at least some of the interferometric modulators move away from the actuated state.

11. The method of claim 10, wherein the potential difference is substantially equal to twice the bias voltage.

12. The method of claim 10, wherein an absolute value of the bias voltage is less than an absolute value of a voltage corresponding to a hysteresis window for the at least some of the interferometric modulators.

13. A method of actuating an array of interferometric modulators multiple times to display a single row of data, the method comprising:

receiving a data signal for actuating one or more interferometric modulators during a time period corresponding to a single row;

actuating the one or more interferometric modulators with a potential difference such that the one or more interferometric modulators moves to a released state;

releasing the one or more interferometric modulators such that the one or more interferometric modulators drifts away from the released state and towards an actuated state; and re-actuating the one or more interferometric modulators such that before reaching the actuated state, the interferometric modulators moves back to the released state.

14. The method of claim 13 further comprising applying a bias voltage to the one or more interferometric modulators while the one or more interferometric modulators drift away from the released state.

15. The method of claim 14, wherein the potential difference is substantially equal to twice the bias voltage.

16. The method of claim 14, wherein an absolute value of the bias voltage is greater than an absolute value of a voltage corresponding to a hysteresis window for the one or more interferometric modulators.

17. A method of driving an interferometric modulator to display a row of data, the method comprising:

receiving a data signal for display by the interferometric modulator during a period of time corresponding to a single row display period; and actuating the interferometric modulator during the single row display period such that the interferometric modulator moves to a released state;

releasing the interferometric modulators such that one or more interferometric modulators drifts away from the released state and towards an actuated state; and re-actuating the interferometric modulators such that before reaching the actuated state, the one or more of the interferometric modulators moves back to the released state.

18. The method of claim 17 further comprising applying a bias voltage to the interferometric modulator while the interferometric modulator moves away from the released state.

19. The method of claim 18, wherein the potential difference is substantially equal to twice the bias voltage.

20. The method of claim 18, wherein an absolute value of the bias voltage is greater than an absolute value of a voltage corresponding to a hysteresis window for the interferometric modulator.

21. A method of writing display data to a row of interferometric modulators in an array of display elements, the method comprising:

writing a first set of display data to the row of interferometric modulators with a potential difference so as to actuate at least some of the interferometric modulators such that the least some of the interferometric modulators move to a released state;

releasing the at least some of the interferometric modulators in the row of interferometric modulators such that the at least some of the interferometric modulators drift away from the released state and towards an actuated state; and re-actuating the at least some of the interferometric modulators such that before the at least some of the interferometric modulators reach the actuated state, the at least some of the interferometric modulators move back to the released state.

22. The method of claim 21 further comprising applying a bias voltage to the at least some of the interferometric modulators in the row of interferometric modulators while the at least some of the interferometric modulators move away from the released state.

23. The method of claim 22, wherein the potential difference is substantially equal to twice the bias voltage.

24. The method of claim 22, wherein an absolute value of the bias voltage is greater than an absolute value of a voltage corresponding to a hysteresis window for the at least some of the interferometric modulators.

* * * * *

UNITED STATES PATENT AND TRADEMARK OFFICE
CERTIFICATE OF CORRECTION

PATENT NO. : 7,626,581 B2  Page 1 of 1
APPLICATION NO. : 11/112487
DATED : December 1, 2009
INVENTOR(S) : Chui et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1258 days.

Signed and Sealed this

Second Day of November, 2010

David J. Kappos
*Director of the United States Patent and Trademark Office*